(12) United States Patent
Chen et al.

(10) Patent No.: US 7,382,957 B2
(45) Date of Patent: Jun. 3, 2008

(54) RARE EARTH DOPED DOUBLE CLAD OPTICAL FIBER WITH PLURALITY OF AIR HOLES AND STRESS RODS

(75) Inventors: Xin Chen, Corning, NY (US); Ji Wang, Painted Post, NY (US); Joohyun Koh, Painted Post, NY (US); Ming-Jun Li, Horseheads, NY (US); Daniel Aloysius Nolan, Corning, NY (US); Donnell Thaddeus Walton, Painted Post, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/483,229

(22) Filed: Jul. 7, 2006

(65) Prior Publication Data
US 2007/0177846 A1 Aug. 2, 2007

(51) Int. Cl.
G02B 6/02 (2006.01)
G02B 6/00 (2006.01)

(52) U.S. Cl. ........................ 385/123; 385/142
(58) Field of Classification Search ........ 385/125–132, 385/142
See application file for complete search history.

(56) References Cited

U.S. PATENT DOCUMENTS 4,666,247 A * 5/1987 MacChesney et al. ...... 385/142
5,278,931 A * 1/1994 Antos et al. ................ 385/126
5,841,131 A * 11/1998 Schroeder et al. ..... 250/227.17
6,954,575 B2 * 10/2005 Fermann et al. ............ 385/128
7,158,705 B2 * 1/2007 Berkey et al. .............. 385/123
2007/0266738 A1* 11/2007 Gallagher et al. ............ 65/393

FOREIGN PATENT DOCUMENTS

| EP | 0540386 A1 | 10/1992 |
| FR | 2655326 | 1/1989 |
| WO | 2004/030165 | 4/2004 |
| WO | 2005/043700 | 5/2005 |
| WO | WO 2005/059612 | * 6/2005 |
| WO | 2005/082801 | 9/2005 |

OTHER PUBLICATIONS

"Polarization Maintaining Fibers and Their Applications"; Juichi Noda et al; Journal of Lightwave Technology; vol. LT-4; No. 8, Aug. 1986; p. 1071-1089.
XP002307643: "Polarization Maintaining Large Mode Area Photonic Crystal Fiber"; J. R. Folkenberg, et al; Mar. 8, 2004; vol. 12, No. 5; Optics Express 956.

* cited by examiner

Primary Examiner—Brian Healy
Assistant Examiner—Charlie Peng
(74) Attorney, Agent, or Firm—Svetlana Z. Short

(57) ABSTRACT

An optical fiber including: (i) a silica based, rare earth doped core having a first index of refraction $n_1$; and (ii) at least one silica based cladding surrounding the core and having a second index of refraction $n_2$, such that $n_1 > n_2$, said cladding having a plurality of stress rods and a plurality of air holes extending longitudinally through the length of said optical fiber; wherein said optical fiber supports a single polarization mode or poses-polarization maintaining properties within the operating wavelength range.

18 Claims, 10 Drawing Sheets

— By He@155'c
-○- By Ar@155c

-✶- Yb2O3
-△- Al2O3

RARE EARTH DOPED DOUBLE CLAD OPTICAL FIBER WITH PLURALITY OF AIR HOLES AND STRESS RODS

BACKGROUND OF THE INVENTION

1. Field of the Invention

The present invention relates generally to optical waveguide fibers, and more particularly to a rare earth doped optical fiber exhibiting single polarization properties and high birefringence.

2. Technical Background

The present invention relates generally to double clad rare earth doped optical fibers, and particularly to single polarization rare earth doped optical fibers suitable for use with high power light sources or in optical fiber lasers and optical amplifiers.

TECHNICAL BACKGROUND

Optical fiber has become a favorite medium for telecommunications due to its high capacity and immunity to electrical noise. Single clad rare earth doped optical fiber has been widely used in the field of optical amplifiers and fiber lasers. This type of fiber has low capability of handling high power multimode optical sources due to the difficulty of efficiently coupling multimode light from a high power optical (light) source (also referred to herein as optical pump or pump) into the rare-earth doped fiber core.

To solve this problem and to increase the output power of fiber lasers, those of skill in the art utilize optical fiber with a double clad structure (referred herein as double clad optical fiber). Double clad rare-earth doped optical fiber is a fiber that has a core, an inner cladding layer surrounding the core and an outer cladding layer surrounding the inner cladding layer and is more efficient in retaining/utilizing optical power provided by the pump than single clad optical fiber. This higher efficiency is due to fiber's utilization of clad-to-core coupling of optical pump power. More specifically, rare-earth doped double clad optical fibers accept light from the optical pump into the inner cladding and then transfer light to the rare-earth doped core through the core-to-inner cladding interface, along the length of the optical fiber. Thus, the optical fiber converts a significant part of the multi-mode light propagated through the inner cladding into a single-mode output at a longer wavelength, by coupling this pump light into the rare-earth doped core.

The inner cladding of the double clad optical fiber has a higher index of refraction than the outer cladding, thus the pump energy is confined inside the inner cladding and is re-directed into the core. The optical fiber is optically active due to the presence of rare-earth dopant in the core, which can be excited to higher electronic energy levels when the optical fiber is pumped by a strong optical pump. Cladding pumping can be utilized in fiber amplifiers, or employed to build high-power single mode fiber pump lasers.

Thus, conventional double-clad arrangements facilitate pumping of the fiber using a multi-mode inert cladding for accepting and transferring pump energy to a core along the length of the device.

How much pump light can be coupled into a double-clad fiber's inner cladding depends on the cladding size and numerical aperture NA. As is known, the "etendue" (numerical aperture multiplied by the aperture dimension or spot size) of the inner cladding should be equal to or greater than the etendue of the optical pump for efficient coupling. If the numerical aperture and spot size of the optical source (optical pump are) be different in both axes, in order to have better coupling efficiency, the etendue of the inner cladding should be maintained or exceed that of the pump in both the x and y directions.

Typically, a high numerical aperture NA of the inner cladding, which is related to the difference in refractive index between the inner and outer cladding, is desired. In the well-known design, the first clad layer (inner cladding) is made of glass and the second layer (outer cladding) is made of plastic (for example, fluorinated polymer) with relatively low refractive index in order to increase the numerical aperture NA of the inner cladding. Such plastic may not have the desired thermal stability for many applications, may delaminate from the first cladding, and may be susceptible to moisture damage. In addition, this type of double clad optical fiber may be suitable only for sustained use with relatively low power (lower than 20 Watts) optical sources. When high power sources (more than 100 Watts) are utilized, this type of optical fiber heats and the polymer material of the outer cladding layer carbonizes or burns, resulting in device failure, especially when the fiber is bent. At medium powers (20 Watts to below 100 Watts), the polymer outer cladding ages relatively quickly, losing its mechanical and optical characteristics and becoming brittle, thus shortening the device life.

All-glass, Yb doped optical fibers with a relatively low outer cladding diameter and NA are also known, but these fibers have low coupling efficiency due to light leakage outside of the optical fiber and thus are not suitable for high power applications. That is, a relatively large portion of the light does not enter the optical fiber and is lost. Although this may not be an issue in applications when only a small amount of optical power needs to be coupled into the fiber, such fiber is not efficient for high power applications when the light source power is 100 Watts or more.

Single polarization optical fibers are useful for ultra-high speed transmission systems or for use as a coupler fiber for use with, and connection to, optical components (lasers, EDFAs, optical instruments, interferometric sensors, gyroscopes, etc.). The polarization characteristic (single polarization) propagates one, and only one, of two orthogonally polarized polarizations within a single polarization band while suppressing the other polarization by dramatically increasing its transmission loss.

Polarization retaining fibers (sometimes referred to as a polarization maintaining fibers) can maintain the input polarizations on two generally-orthogonal axes. These fibers are not single polarization fibers. A common polarization maintaining fiber includes stress birefringence members and includes, as shown in FIG. 1A, a circular core 12' surrounded by an cladding region 14'. Core 12' and the cladding region 14' are formed of conventional materials employed in the formation of optical waveguides. The refractive index of the core material is greater than that of the cladding material.

FIG. 1A, diametrically opposed relative to core 12', are two stress-inducing regions 13' formed of a glass material having a Thermal Coefficient of Expansion (TCE) different from that of cladding material 14'. When such a fiber is drawn, the longitudinally-extending stress-inducing regions 13' and the cladding region will shrink different amounts, whereby regions 13' will be put into a state of tension or compression strain. Strain induced birefringence (otherwise referred to a stress-induced birefringence) is imparted in the fiber and thereby reduces coupling between the two orthogonally polarized findamental modes. It should be recognized that such fibers including these stress-inducing regions 13' do not provide single polarization properties.

Single polarization fibers with a plurality of airholes are also known, however these fibers are not active (they do not include rare earth elements) and thus are not suited for light amplification. Furthermore, such fibers have a high relative refractive index core delta which makes it difficult to achieve large mode field diameter.

Slight improvement in the polarization performance of single mode-optical fibers has been achieved by elongating or distorting the fiber core geometry, as a means of decoupling the differently polarized light components. However, the noncircular geometry of the core alone is, generally, not sufficient to provide the desired single polarization properties. It is also noted that this type of optical fiber has relatively low birefringence (i.e., $10^{-5}$ or less). Furthermore, these fibers are not optically active fibers and, therefore are not suitable for use as a laser or an amplifier fiber.

It has, therefore, been an area of ongoing development to obtain an optical fiber that will single polarization performance and has a large mode field area, while being suitable for use as optical amplification medium.

SUMMARY OF THE INVENTION

Definitions

The following definitions and terminology are commonly used in the art.

Refractive index profile—the refractive index profile is the relationship between the refractive index ($\Delta$ %) and the optical fiber radius (as measured from the centerline of the optical fiber) over a selected portion of the fiber.

Birefringence—birefringence is the difference between the effective refractive indices of the two polarization modes.

Radii—the radii of the segments of the fiber are generally defined in terms of points where the index of refraction of the material used takes on a different composition. For example, the central core has an inner radius of zero because the first point of the segment is on the centerline. The outer radius of the central core segment is the radius drawn from the waveguide centerline to the last point of the refractive index of the central core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, a down-doped annular segment surrounding the central core would have an outer radii located at the interface between the annular segment and the cladding.

Relative refractive index percent $\Delta$ %—the term $\Delta$ % represents a relative measure of refractive index defined by the equation:

$$\Delta\% = 100 \times (n_i^2 - n_c^2)/2n_i^2$$

where $\Delta$ % is the maximum refractive index of the index profile segment denoted as i, and $n_c$, the reference refractive index, is taken to be the refractive index of the cladding layer. Every point in the segment has an associated relative index measured relative to the cladding.

In accordance with some embodiments of the present invention, an optical advantageously exhibits a large mode field (core radius of at least 4 μm, preferably at least 7 μm and more preferably at least 9 or 10 μm, and/or effective area of at least 50 μm, preferably of at least 153 μm², more preferably of at least 250 μm² and even more preferably of at least 315 μm², high birefringence ($1\times10^{-4}$ and higher), and either polarization maintaining (retaining) properties or single polarization, while being suitable for use as an optical amplification media. In accordance with some of the embodiments of the present invention, a rare earth doped optical fiber is provided which exhibits single polarization properties within a Single Polarization Band (SPB). The fibers parameters are preferably selected such that the SPB coincides with an operating wavelength band.

According to the present invention the optical fiber includes: (i) a silica based, rare earth doped core having a first index of refraction $n_1$; and (ii) at least one silica based cladding surrounding the core and having a second index of refraction $n_2$, such that $n_1 > n_2$, said cladding having a plurality of stress rods and a plurality of air holes extending longitudinally through the length of said optical fiber; wherein said optical fiber supports a single polarization mode or poses polarization maintaining properties within the operating wavelength range.

According to an embodiment of the present invention the optical fiber includes:

(i) a silica based, rare earth doped core having a first index of refraction $n_1$;

(ii) a silica based inner cladding surrounding the core and having a second index of refraction $n_2$, such that $n_1 > n_2$, the inner cladding having a plurality of stress rods and a plurality of air holes extending longitudinally through the length of said optical fiber;

(iii) a silica based outer cladding surrounding the inner cladding and having a third index of refraction $n_3$, such that $n_2 > n_3$;

wherein the optical fiber exhibits polarization maintenance or supports a single polarization mode within the operating wavelength range.

One advantage of the optical fiber of the present invention is its capability to produce gain, thus being capable for use in a laser or an optical amplifier while (i) performing as polarization maintaining or a single polarization fiber exhibiting a single polarization band SPB width of greater than 20 mn and even more-preferably greater than 50 nm, and (ii) being capable of handling relatively large amounts of optical power. Another advantage of the optical fiber of the present invention is that because it is capable of performing both as a gain fiber and the SP fiber, it eliminates the need to for splicing together gain fiber and the single polarization fiber, thereby reducing the splicing loss, the overall fiber length, while eliminating work and cost associated with splicing the two fibers together.

More particularly it is believed that in these embodiments the effective refractive index of one of the polarizations is such that this polarization cannot propagate within the SPB, while the other orthogonal polarization associated with different effective refractive index is such that this polarization may still propagate in the SPB. Accordingly, single polarization propagation within the SPB is provided by the rare earth doped fiber with a relative simple structure. In some of the embodiments of the optical fibers according to the present invention the SPB width is 100 to 300 nm.

According to some embodiments of the present invention the optical fiber is also suitable as polarization maintaining fiber with the large mode area. In some of the embodiments, the birefringence is greater than 0.0001 and the core radius is greater than 10 μm. Single polarization operation of such fibers is possible by using a method such as bending to eliminate higher order mode or unwanted fundamental mode.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

DETAILED DESCRIPTION OF THE EMBODIMENTS

Figure 1A:
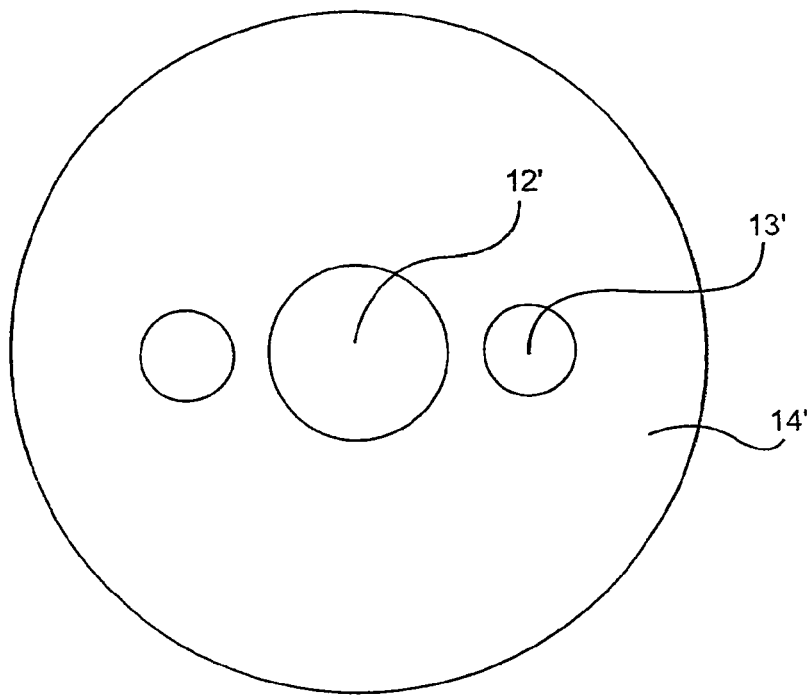
FIG. 1A is a schematic cross-sectional view of a prior art optical fiber.

Reference will now be made in detail to the present preferred embodiments of the invention, examples of which are illustrated in the accompanying drawings. Whenever possible, the same reference numerals will be used throughout the drawings to refer to the same or like parts. Two embodiments of double clad single polarization optical fiber in accordance with the present invention are shown schematically in FIGS. 1B and 1C, and are designated generally throughout by the reference numeral 10. The optical fiber 10 illustrated in FIG. 1B includes: silica based, rare earth doped core 12 having a first index of refraction $n_1$; a first silica based cladding 14 (inner cladding) surrounding the core 12 and having a second index of refraction $n_2$, such that $n_1 > n_2$; and a silica based outer cladding 16 surrounding the first cladding 14 and having a third index of refraction $n_3$ such that $n_3 < n_2 < n_1$. The first cladding (inner cladding) 14 is preferably round to enable easy coupling between the optical fiber 10 and the light source-and easy splicing, and contains at least two stress applying parts, for example stress rods 13 and 15 located on diametrically opposite sides of the core 12 along the line Y-Y. The stress applying parts have a thermal expansion coefficient that is different from that of the inner cladding. The stress applying parts create stress birefringence. The refractive index of the stress applying parts is $n_4$. Preferably $n_4 \leq n_2$ to avoid forming a waveguide in the stress applying parts (stress rods themselves). The stress rods advantageously improve birefringence of the optical fiber 10 and reduce the need for the high core refractive index delta, which facilitates large mode field area and enables the fiber core radius $r_1$ to be larger than 4 µm, preferably larger than 7 µm, and more preferably larger than 10 µm. The inner cladding 14 also contains at least two air holes 24, 26, preferably situated on diametrically opposite sides of the core 12 and extending along the core 12, through the length of the fiber 10. The air holes 24, 26 lower the effective refractive index of the inner cladding 14 along the line A-A that is preferably perpendicular to the line Y-Y of the stress applying parts illustrated in FIG. 1B. The two air holes 24 and 26 have a refractive index of $n_5=1$. The air holes have two functions. First, the air holes create form birefringence, which adds to the stress birefringence, so as to enable a larger total birefringence. Second, the air holes can be utilized to cut off one polarization mode, which makes a single polarization fiber. The core 12, inner cladding 14 and the outer cladding 16 are made of glass. A protective coating 18 surrounds the outer cladding 16. The outer coating 18 may be, for example, an organic coating which typically includes a softer primary coating and a harder secondary coating applied over the primary coating.

In this embodiment the silica based core 12 is doped with Yb, but other rare earth materials, such as for example Er, Nd, Tm, Tb, Sm, Gd, Ho, Pr may also be utilized and may co-doped with additional dopants such as Al, P, F as de-clustering agent. The core 12 may also include at least one index raising dopant among the following: Ge, Al, P, Sb, La, Y. If the core does not contain the optional rare-earth dopants, the optical fiber will be a passive fiber exhibiting polarization maintaining and/or the single polarization property. The core 12 may also include at least one athermal element (dopant) such as B, Li, Na, K, Rb, Cs, which stabilizes the core's optical refractive index (minimizes its changes) due to increased temperature in high power applications. Preferably the amount of athermal element(s) in the core 12 is in the 0 to 11 wt % range, more preferably 1 to 10 wt % and most preferably 2 to 10 wt %. The inner cladding 14 may also include at least one index rising dopant. Preferably, the index raising dopant is Ge for the core and cladding, and the relative refractive index delta of the core with respect to the inner cladding is between 0.05% and 0.5%, more preferable between 0.1% and 0.2%, and even more preferably between 0.08% and 0.13%. This core delta results in large mode area fiber. The core radius $r_1$ is larger than 4 µm and preferably is in the range of 4-50 µm, more preferably in the range of 10-25 µm which also facilitates large mode area. Typical core radii are, for example, 10 µm, 11 µm, 12 µm, 13 µm, 15 µm, 16 µm, 18 µm, 20 µm, and 22 µm. The relative refractive index delta of the inner cladding 14 with respect to the outer cladding 16 is between 1% to 3%, more preferably between 1.5 and 2.5%. The inner cladding diameter $D_{IN}$ is preferably at least 125 µm, more preferably at least 145 µm, and more preferably at least 200 µm. It is even more preferable that inner cladding diameter $D_{IN}$ is at least 225 µm and-most preferable at least 250 µm. The outer cladding 16 further preferably includes an index lowering dopant, such that $n_2>n_3$. Preferably, the index lowering dopant is F, or B. It is preferable that the outer cladding 16 be relatively thin, with wall thickness less than 80 µm and preferably between about 5 µm and 35 µm. It is most preferable that the wall thickness of the outer cladding 16 be between about 10 µm to 25 µm. The stress applying parts can be pure silica, porous silica or doped silica. Preferably, the doping material of the stress applying parts (e.g., rods 13 and 15) is B, or Ge, or P or their combinations. If the stress applying parts (e.g., rods 13, 15) have a circular cross-section, the radius of the rods $r_4$ is preferably between 10 µm to 100 µm. However, the rods may also have a non circular (for example, elliptical) cross-section with at least one cross-sectional axis or dimension being 10 µm to 100 µm (for example, 20 µm, 25 µm, 30 µm, 40 µm or 50 µm). The rod's center is situated at a distance $r_4c$, where $r4_c$ is between 5 to 100 µm from the core's center. The distance between the edge of the core 12 and the outer diameter of the stress rod is preferably at least 3 µm, and more preferably 5 µm to 10 µm because of tradeoff between fiber attenuation and birefringence. The air hole radius $r_5$ is preferably between 2 to 50 µm, (for example 5 to 25 µm). The air holes are preferably situated directly adjacent to the core. Applicants discovered that the thick inner cladding 14 and all-glass construction of the optical fiber work in synergy to allow the optical fiber to be coupled to high energy source, and to couple the high power into the core without damaging the optical fiber. The two stress applying parts and the two air holes introduce high stress and form birefringence, enhancing the fiber's polarization maintaining properties. The two air holes also reduce the refractive index of fundamental polarization modes, which enable the optical fiber to be a single polarization fiber.

Figure 2:
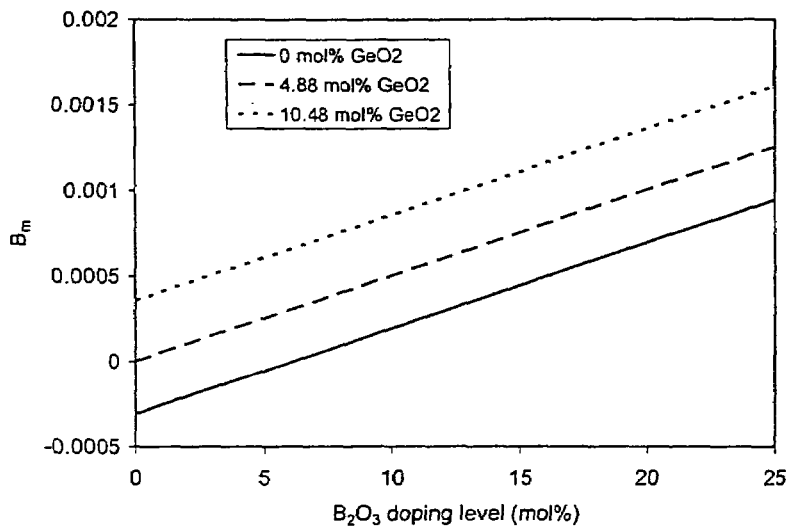
FIG. 2 illustrates material birefringence factor vs. boron dopant level in the stress rods.

The stress birefringence of the stress rods 13, 15 depends on dopant type and its concentration in the stress rods, as well the size and location of the stress rods. The average stress birefringence provided by the stress rods 13, 15 can be estimated by the following equation $$B = B_m \frac{r}{r_c}\left[1 - 48\left(\frac{r}{R}\right)^4\right]$$

where r is the radius of the stress rod, $r_c$ is the center position of the stress rod relative to the fiber center, R is the fiber radius, $B_m$ is a factor that depends on glass material properties:

$$B_m = \frac{2EC\Delta\alpha_T \Delta T}{1-v}$$

where E is the Young's modulus, C is the photoelastic constant, $\Delta\alpha$ is the difference in thermal expansion coefficient between the stress rod and the surrounding glass, v is the Poisson's ratio and $\Delta T$ is the difference between room temperature and the softening temperature of the stress rod. FIG. 2 shows $B_m$ of the rods 13, 15 as a function of $B_2O_3$ doping level for-three cases: rods without co-doing with $GeO_2$, rods co-doped with 4.88 mol % $GeO_2$ and rods co-doped with 10.48 mol % $GeO_2$. In this example, the inner cladding 14 is made of silica doped with 4.88 mol % $GeO_2$. It is seen that the birefringence factor increases linearly with the rod's $B_2O_3$ doping level for all the three cases. For the case without $GeO_2$ in the stress rod, the value of $B_m$ is negative because the thermal expansion coefficient in the stress rod is less than that of the inner clad doped with 4.88 mol % $GeO_2$. Co-doping silica based $GeO_2$ doped rods with with $B_2O_3$ increases the difference thermal expansion coefficient, thus increases the birefringence factor. However, because $GeO_2$ increases the refractive index, $B_2O_3$ dopant has to be adjusted accordingly to avoid forming a waveguide in the stress rods. For example, if the stress rod is doped with 10.48 mol % $GeO_2$, the $B_2O_3$ level must be greater than 10 mol % to insure that the refractive index of the rod 13, 15 is below the refractive index of the inner cladding 14.

Figure 3:
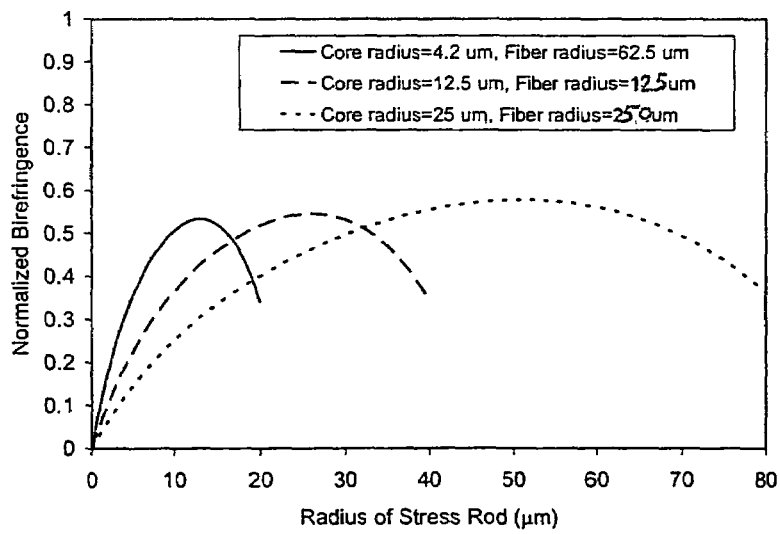
FIG. 3 shows normalized birefringence as a function of the stress rod radius.

For a stress rod with given dopants and concentrations, the total birefringence in the fiber core depends on the size and location of the stress rods. In general, placing the stress rod close to the core will increase the birefringence. However, for stress rods doped with $B_2O_3$, fiber loss will increase when moving the rods close to the core for operating wavelengths greater than 1300 mn. It is preferable in these cases that the distance between the core edge and stress rod edge is greater than 5 µm. FIG. 3 plots the normalized birefringence $B/B_m$ as a function of stress rod radius for three fiber radii, 62.5, 125 and 250 µm. In FIG. 3, the distance between the core edge and stress rod edge is kept to a constant of 5 µm. For each fiber radius, there is an optimum radius for the stress rod that maximizes the birefringence. For three cases, the optimum radii of stress rod are 13, 26, and 52 µm, respectively.

It is preferable that the diameter of the outer cladding diameter ($D_{OUT}$) be about 145 to 2100 µm, more preferably between about 145 µm to 1600 µm and even more preferable that $D_{out}$ be about 145 µm to 500 µm. If the inner cladding 14 does not have a circular cross section, Din is defined as the smallest distance from one side of the inner cladding's cross section to the oppositely situated side of the cross section. It is also noted that the outer cladding 16 may not be circular. If the outer cladding 16 is not circular, $D_{OUT}$ is defined as the smallest distance from one side of the outer cladding's cross section to the oppositely situated side of the outer cladding's cross section. It is preferable that the inner cladding's 14 cross-sectional area be at least 200 times larger than the cross sectional area of the core 12. It is even more preferable that the cross sectional area of the inner cladding 14 be between 300 and 3000 times larger than the cross sectional area of the core 12. For example, the cross sectional area of the inner cladding 16 may be 500, 700, 1000, 1200, 1500, 1600, 2000 or 2500 times larger than the cross sectional area of the core 12.

According to this embodiment, the fiber core 12 includes, in weight percent:

| | |
|---|---|
| Rare earth | 0.1 to 2.5 wt %; |
| P | 0 to 5 wt %; |
| Al | 0.5 to 15 wt %; |
| Ge | 0.1 to 15 wt %; |
| F | 0 to 1 wt % |
| B | 0 to 10 wt %. |

For example, the amount of boron B may be 0.5 wt %, 1 wt %, 2 wt %, 3 wt %, 4 wt %, 5 wt %, 6 wt %, 7 wt %, 8 wt %, 9 wt % or 10 wt %.

The rare earth dopants in the fiber core 12 provide active ions to enable either a gain or a lasing action. Exemplary rare earth dopants are Yb, Er, Nd, Tm, Sm and Tb. It is preferable that the amount of rare earth dopant in the core 12 be 0.5 wt % to 1.5 wt %. Phosphorus may be added to the core materials in order to lower the softening temperature of the core glass, which may be advantageous if the core is produced by the inside vapor deposition process. Phosphorus may also be utilized as a refractive index raising agent. However too much phosphorus (10% or more) provides nonlinearity through Stimulated Raman Scattering which may inhibit the lasing action. Aluminum may be added to the core as a de-clustering agent (for example, to de-cluster Yb, preferably at the ratio of Al to Yb of 3:1 to 10:1). The core 12 may also include Germanium which is an index raising dopant, and/or fluorine which is an index lowering dopant as well as a de-clustering agent.

The preferred ranges of the core 12 composition in weight percent are:

| | |
|---|---|
| Rare earth | 0.3 to 1 wt %; |
| P | 0 to 2 wt %; |
| Al | 2 to 8 wt %; |
| Ge | 3 to 15 wt %; |
| B | 0 to 5 wt % and |
| F | 0.1 to 0.5 wt %. |

The Yb-doped core 12 will laze at 1.03-1.11 micron range.

It is preferabel that the inner cladding 14 contain 5 wt % to 30 wt % Ge in order to provide high NA. It is even more preferable that the inner cladding comprise 5 wt % to 20 wt % Ge. It is noted that 5 wt % to 10 wt % Ge works well for many applications.

It is preferable that the stress applying parts 13, 15 contain Boron. It is more preferably to add Germanium to balance the refractive index of the stress parts. The preferred ranges for Boron and Germaniun dopants in the stress rods, in weight percent, are:

| | |
|---|---|
| B | 5 to 30 wt % |
| Ge: | 5 to 20 wt %. |

It is preferable that the index lowering dopant of the outer cladding 16 comprises Fluorine and/or Boron in weight percent:

| | |
|---|---|
| F | 0.5 to 5 wt %; |
| B | 0.5 to 20 wt %. |

The amount of dopant(s) for the outer cladding 16 is chosen to preferably result in inner cladding NA of between 0.15 to 0.5. However, it is preferable that the outer cladding 16 contain at least one of B or/and F. It is preferable that the amount of B is at least 3 wt %. It is preferable to have more than 1 wt % and more preferably more than 2 wt % of F along with more than 8 wt % of B in the outer cladding 16. It is preferable that the outer cladding 16 has less than 5 wt % of F, and less than 15wt % of B. It is even more preferable that the amount of B and F be: 2 to 4 wt % of F and 3 to 15 wt % of B.

Figure 4A:
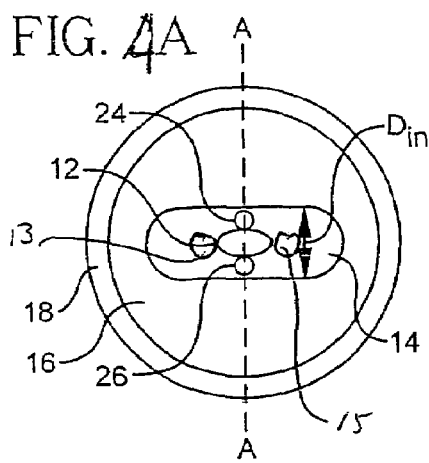
FIGS. 4A-4C are schematic cross-sectional views of other embodiments of the present invention.
Figure 4B:
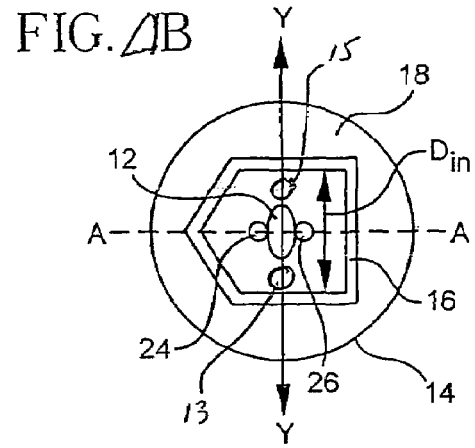
Figure 4C:
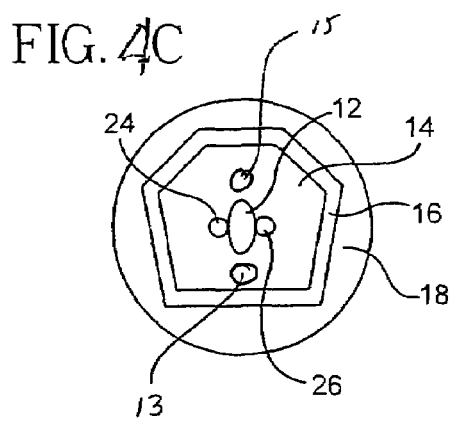

Other embodiments of the double clad optical fiber of the present invention are shown schematically in FIGS. 4A-4C and are generally described and depicted herein with reference to several exemplary or representative embodiments with the same numbers referenced to the same or functionally similar parts. The inner cladding 14 of the optical fiber is preferably circular, but may be non-circular as shown in FIGS. 4A-4C is non-circular. The advantage of non-circular inner cladding 14 is that non-circular shape improves the absorption of optical pump power into the core 12. The elongated core 12 may be located either at the geometric center of the inner cladding, or may be displaced from the geometric center of the inner cladding.

The optical fiber core 12 is preferably circular, but may be elliptical, as shown in FIGS. 1B, 1C and 4A-4C, but may have other non-circular shapes. Adjacent to the core and situated at least partially within the inner cladding 14 are at least two air holes 24, 26. The elongated (elliptical) core 12, in conjunctions with the air holes 24, 26 renders this optical fiber a single polarization (SP) fiber. It is preferred that the aspect ratio (ratio of major to minor axis) of the elliptical core 12 be at least 1.5:1 and more preferably be between 2:1 and 10:1, because these aspect ratios improve birefringence of the core 12.

The core delta is less than 1% Δ and preferably less than 0.5% Δ. The numerical aperture NA of the core 12 is between 0.05 (for high power laser applicatiori) and 0.25 (for lower power application). The numerical aperture NA of the core 12 is defined as $(n_1^2 - n_2^2)^{1/2}$, where $n_1$ is the index of refraction of the core 12 and $n_2$ is the index of refraction of the inner cladding 14.

Figure 1B:
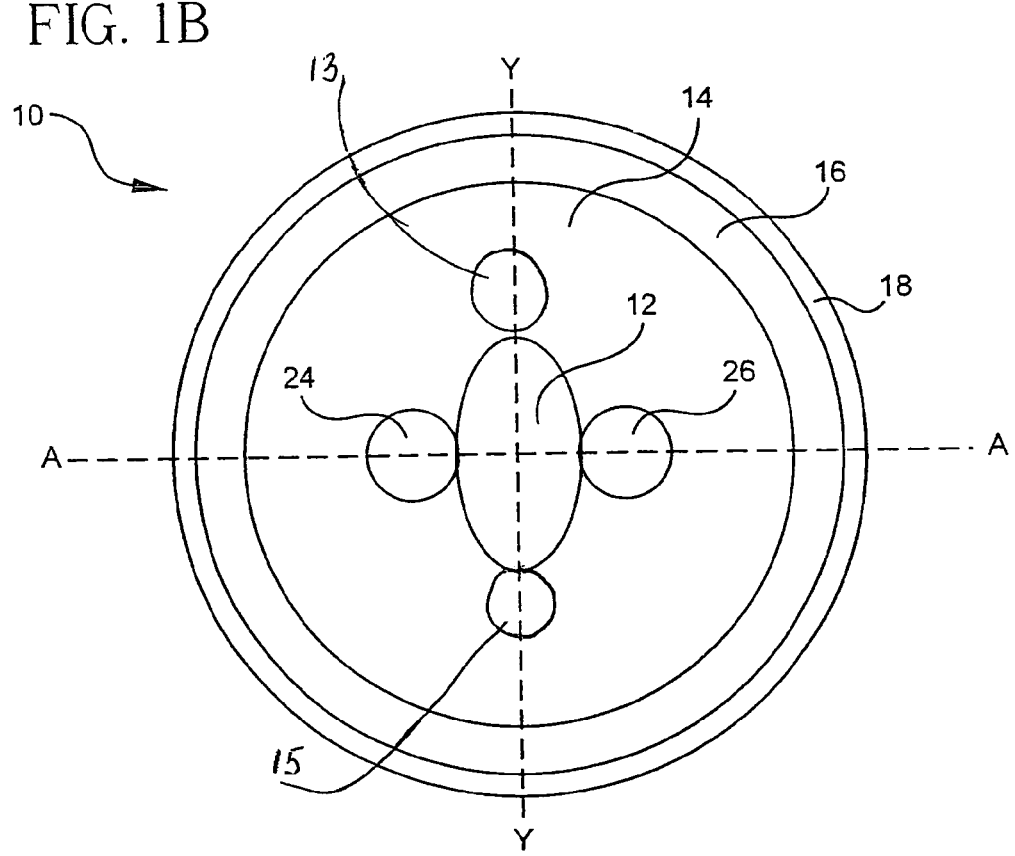
FIGS. 1B and 1C is a schematic cross-sectional view of two embodiments of the present invention.
Figure 1C:
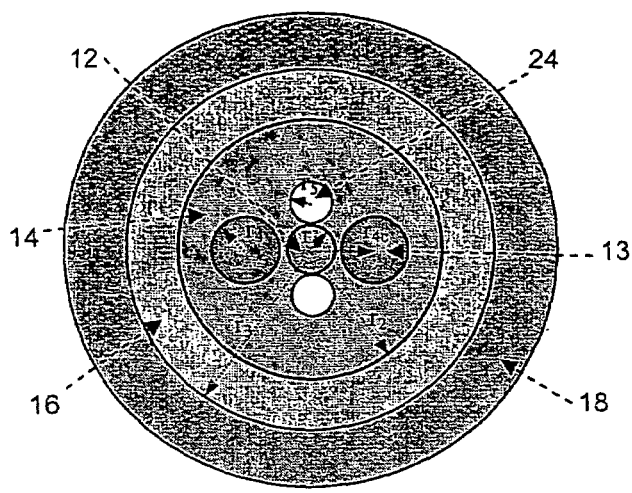

The silica based inner cladding 14 may have a circular outer perimeter, as shown in FIGS. 1B and 1C (can be with an off-center situated core), or a non-circular outer perimeter as shown in FIGS. 4A-4C. The numerical aperture NA of the inner cladding 14 is defined as $(n_2^2 - n_3^2)^{1/2}$, where $n_3$ is the index of refraction of the outer cladding layer 16. The inner cladding preferably has numerical aperture NA between 0.15 and 0.45 and more preferably between 0.3 and 0.4.

In general, a double-clad structure that could be used in a fiber laser or in an amplifier includes two claddings. A first (inner) multi-mode cladding acts as a multi-mode pumping core. The inner cladding 14 is adjacent to the core 12 and a second (outer) cladding 16 surrounds the first or the inner cladding 14. The core 12 may be either single mode or multi-mode at the core lasing wavelength. The inner cladding 14 serves as a waveguide with a high numerical aperture NA for the input (pumping) light. That is, the inner cladding serves as a pump cavity. The larger the inner cladding diameter, the more pump light is coupled into the inner cladding from the optical source. The cross-section of the first multi-mode inner cladding ($D_{IN}$ is the shorter dimension of the inner cladding as seen in FIGS. 4A-4C) may be designed to have a desired shape, e.g., matched to the near field shape of the pump source or have any other which increases coupling efficiency of the (pump) light from the light source to the inner cladding. The numerical aperture of the inner cladding must be high enough to capture the output of the light source, such as the laser diode. Recent progress in semiconductor laser technology has led to the creation of light sources utilizing discrete or arrayed broadarea laser diodes coupled to the intermediate fiber incorporated within the light source. The output power of this light source is more than 150 Watt at 976 nm at the output end of the intermediate fiber. The diameter of the intermediate fiber and NA of light source is 200 μm and 0.22 NA, respectively.

Figure 5A:
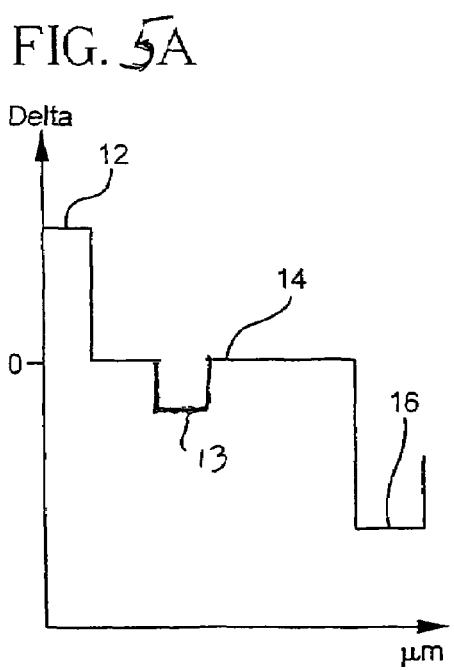
FIGS. 5A and 5B illustrate schematically relative a refractive index profiles of an exemplary optical fiber of the present invention, across two different cross-sections of the fiber.
Figure 5B:
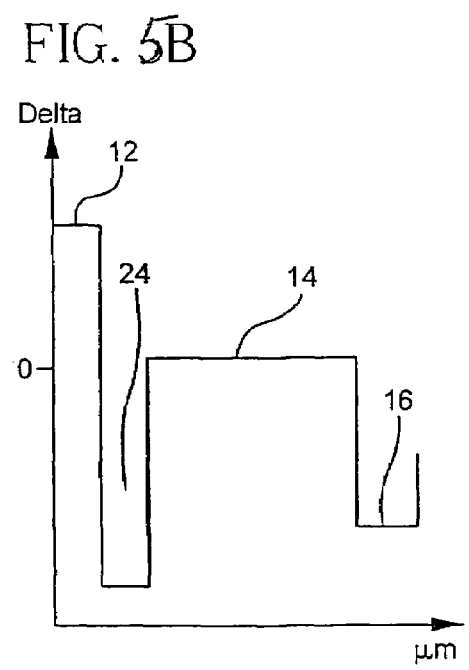
Figure 6:
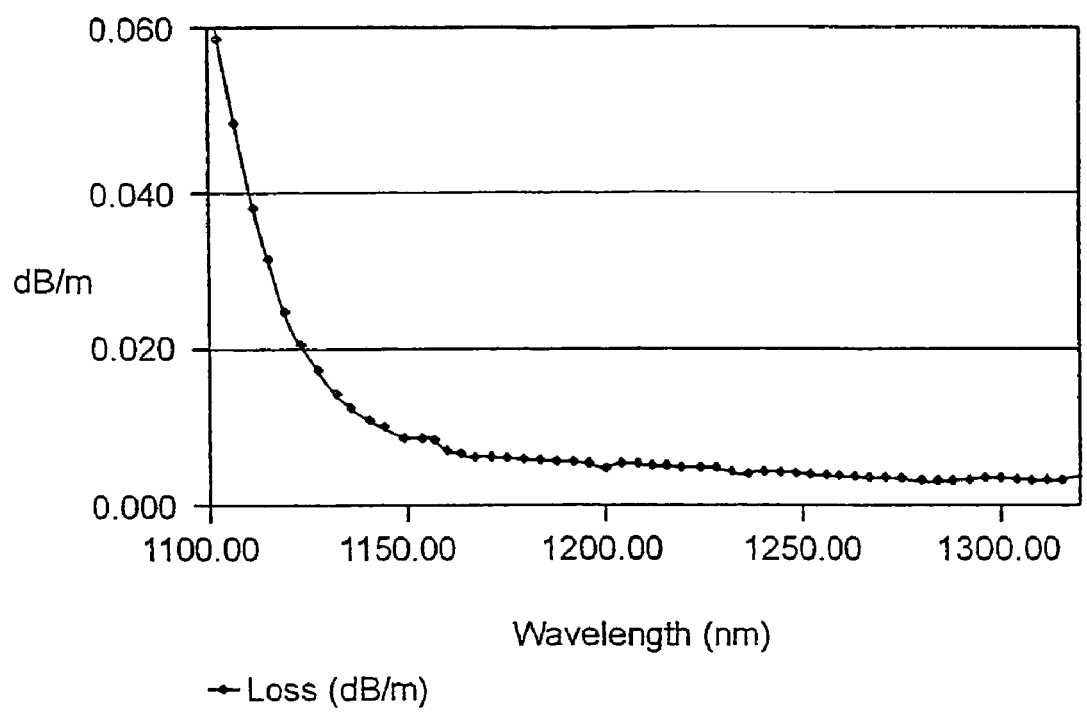
FIG. 6 is a graph illustrating passive core loss vs. wavelength of the exemplary optical fiber according to one embodiment of the present invention.

FIGS. 5A and 5B illustrate schematically relative refractive index profiles of an exemplary embodiment of the optical fiber 10. FIG. 5A is the relative refractive index profile across the stress rods, along the line Y-Y. FIG. 5B is the relative refractive index profile across the air-holes rods, along the line A-A.

The light from this light source is then coupled to a double clad optical fiber via high NA and large aperture lenses. With this approach one can obtain 85-90% of coupling efficiency.

EXAMPLES

The fiber structure can be used to design fibers with large birefringence, or with large single polarization window. The table below (Table 1) shows six exemplary fiber embodiments with different fibers parameters. For all the six examples, the inner cladding 14 is doped with 4.88 mol % $GeO_2$, which corresponds to an index delta of 0.52%. The stress rods 13, 15 are doped with 20.8% $B_2O_3$. The stress rod radius and location are selected according to the fiber radius and the core radius to give maximum stress birefringence. In the first example, the fiber core has a relative refractive index delta of 0.2% with respect to the inner cladding, and a core 12 radius of 4.2 μm. The stress rods 13, 15 in this example do not contain $GeO_2$. The air hole radius is 5 μm. As shown in the table, the birefringence is calculated to be 0.00032. The birefringence can be increased if the stress rods are doped with $GeO_2$ in addition to $B_{2O3}$. In the second example, the fiber parameters are the same as in the first example except that the stress rods 13, 15 contains 4.88 mol % $GeO_2$. It is can be seen that the birefringence is increased to 0.00038. In the first two examples, both fundamental polarization modes can propagate at the wavelength of 1060 nm, so the fibers are of the polarization maintaining type. Single polarization fiber can be designed if one polarization mode is cut off at the operating wavelength window. In the third example, to create a fundamental mode cutoff, the core refractive index delta is lowered to 0.17% and the air hole size is increased to 6 μm. The fiber 10 of the third example utilizes Yb doped core and becomes a single polarization fiber at the 1060 nm window (i.e., in the range of about 1000 nm to about 1200 nm). If Er is used instead of Yb, the single polarization window will be centered at about 1550 nm (corresponding to the wavelength range of about 1520 nm to about 1580 mn).The single polarization bandwidth of this fiber is 150 nm. The single polarization window can be enlarged further if the fiber birefringence is increased. In the fourth example, the fiber has larger stress rods with a radius of 24.5 μm. The fiber core 12 has a refractive index delta of 0.1% and a core radius of 5 μn. The air hole radius is 10 μm. This fiber has a much larger single polarization window of 325 nm. In some applications, large mode area is desired. In the fifth example, the fiber has a core refractive index delta of 0.1% and a radius of 12.5 μm. The fiber (of the fourth example) has a birefringence of 0.000125. In the sixth example, the fiber has an even lager core with a radius of 25 μm. The fiber has a birefringence of 0.00025. In the last two examples of fibers with large core size (examples f5 and 6), the fibers are not single polarization fiber, and are not single mode fiber because higher order modes exist. However, these fibers (Ex. 5 and 6) can behave like single mode polarization maintaining (PM) fibers or like single polarization fibers under proper bending conditions, because higher order modes and the low index fundamental mode have higher loss and can be stripped off. The fiber bending radius that achieves that is in the range of 2.5 to 15 cm.

The examples show that the new structure is particularly suitable for making large mode area fiber with large birefringence. Fibers with core radius as large as 25 μm can be achieved, which result in large mode size. Fiber birefringence is in the range of about 0.0001 to 0.0004 are illustrated, which is suitable to make (PM) fibers. Two design examples with single polarizations operations are also shown in the table. Large single polarization window of greater than 100 μm is possible.

TABLE 1

|  | Example | | | | | |
| --- | --- | --- | --- | --- | --- | --- |
|  | 1 | 2 | 3 | 4 | 5 | 6 |
| Core delta relative to inner clad (%) | 0.2 | 0.2 | 0.17 | 0.1 | 0.1 | 0.1 |
| Core radius (μm) | 4.2 | 4.2 | 4.2 | 5 | 12.5 | 25 |
| Fiber radius (μm) | 62.5 | 62.5 | 62.5 | 125 | 125 | 250 |
| Stress rod center (μm) r4c | 22.2 | 22.2 | 22.2 | 34.5 | 43.5 | 81 |
| Stress rod radius (μm) | 13 | 13 | 13 | 24.5 | 26 | 51 |
| GeO2 level in inner cladding 14 (mol %) | 4.88 | 4.88 | 4.88 | 4.88 | 4.88 | 4.88 |
| GeO2 level in stress rods 13 &, 15 (mol %) | 0 | 4.88 | 4.88 | 4.88 | 4.88 | 4.88 |
| B2O3 level in stress rods 13 &, 15 (mol %) | 20.8 | 20.8 | 20.8 | 20.8 | 20.8 | 20.8 |
| Air hole radius (μm) | 5 | 5 | 6 | 10 | 12.5 | 25 |
| Birefringence at 1060 nm ($\times 10^4$) | 3.2 | 3.8 | n/a | n/a | 1.25 | 2.5 |
| Wavelength Cutoff 1 (nm) |  |  | 1015 | 880 |  |  |
| Wavelength Cutoff 2 (nm) |  |  | 1165 | 1205 |  |  |

THE PROCESS FOR MAKING FIBER

The fiber of FIGS. 1B, 1C and 4A-4C is produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making soot-preform. The soot-preform is then consolidated into solid glass in a high temperature furnace, after the bait rod is removed. The core/inner cladding/outer cladding compositions are achieved by utilizing different vapor-ingredients for each of the layers in the soot preform forming process. The core preform is generated first, then consolidated, followed by core/inner cladding preform generation and consolidation, which in turn, is followed by the outer cladding outside vapor deposition process and another consolidation step. The final preform is then drawn into double-clad single polarization optical fiber 10 by known fiber-drawing methods.

More specifically, the following steps are utilized to make the rare earth doped double clad single polarization fiber of FIGS. 1B, 1C and 4A-4C.

Figure 7:
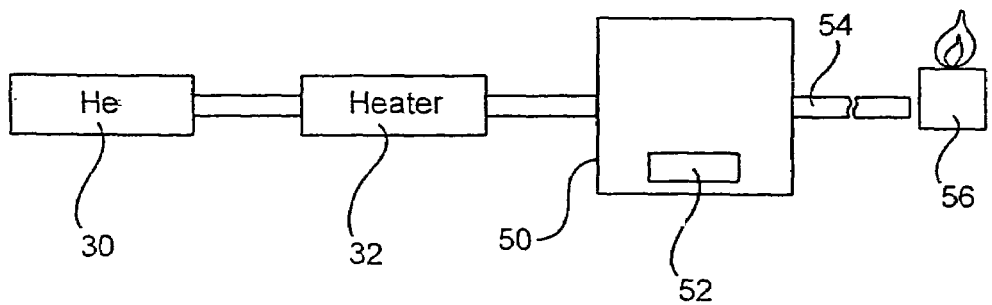
FIG. 7 is a schematic illustration of $AlCl_3$ delivery mechanism.
Figure 8:
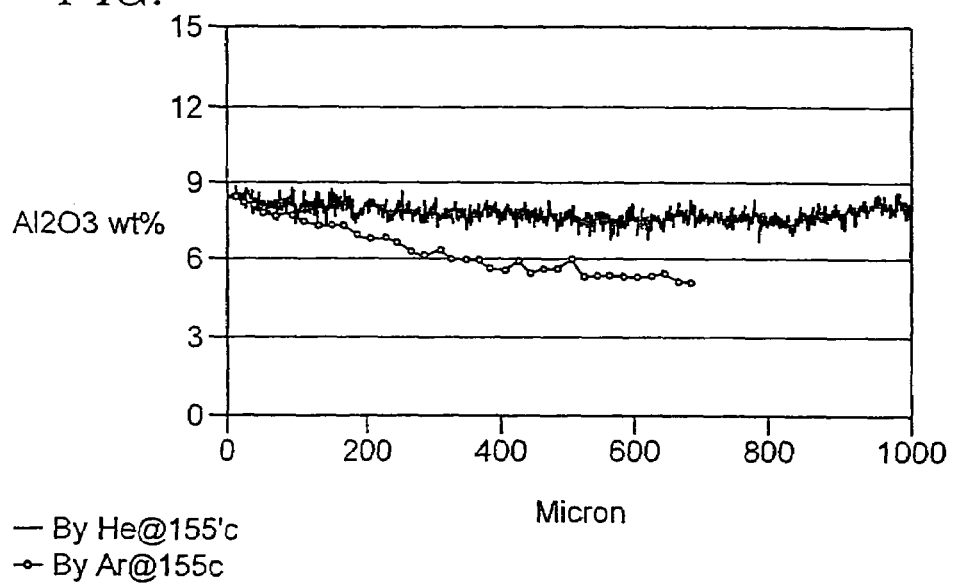
FIG. 8 illustrates $Al_2O_3$ concentration in a preform which resulted from Argon gas delivery (bottom curve) and heated Helium gas delivery (top curve)

1. The core cane is formed first. The core is manufactured, for example, by a standard OVD process. The core materials are deposited onto the bait rod during the laydown step. The exemplary vapor-precursor-materials used to make the fiber core cane are $Yb(fod)_3$, $AlCl_3$, $SiF_4$, $SiCl_4$, $GeCl_4$ and tri-ethyl borate. Other rare-earth materials may be utilized either in addition to Yb, or instead of Yb. During the core deposition process we achieved a uniform $AlCl_3$ gas-phase delivery. This was accomplished by utilizing heated inert Helium as carrier gas 30 (instead of Argon gas) for $AlCl_3$ delivery illustrated schematically in FIG. 7. As solid $AlCl_3$ changes into vapor (gas) phase, it consumes a large amount of heat. Helium gas has high thermal conductivity; effectively transfers heat to $AlCl_3$, and maintains constant vapor pressure of $AlCl_3$. It is preferable that Helium gas is provided at a temperature within 150° C. to 180° C. range. As illustrated in FIG. 7, the heated Helium gas is provided by the He gas heater 32 to the oven 50 containing $AlCl_3$ vessel 52. The relatively high Helium gas temperature helps to maintain the $AlCl_3$ containing vessel 52 at a constant temperature of about 140° C.-160° C. In order to make the optical fiber of this example, Helium gas was heated via heater 32 to 168° C. and the vessel 52 temperature was held constant at 145° C. Higher vessel temperature results higher concentration of Al in the preform. In addition, the Helium gas flow rate was also adjusted for the most uniform delivery throughout the core doping process. In this example, a 10% flow-rate slope (liter/min) is used for the delivery. (The increase in flow rate with subsequent passes was utilized for all other dopants of the core and claddings.) Heated Helium gas carries $AlCl_3$ vapor via a heated gas line 54 to the flame burner (gas burner) 56. To produce the core preform of this example, a 100 passes of core deposition process is started with 1.2 liter/min (pass #1) and ended (after pass # 100) with 1.65 liter/min, resulting in soot preform core thickness of about 2 mm to 3 mm. Heated Helium based $AlCl_3$ delivery may be utilized not only to form a fiber core, but to also provide Al doping to other fiber layers (e.g. cladding), if uniform Al doping of such layers is desired. Furthermore, heated Helium assisted delivery may be also utilized for materials other than $AlCl_3$, which are also endothermic (i.e. heat-absorbing). An Argon gas delivery instead of the Helium gas delivery of $AlCl_3$ may be utilized, but a Helium gas delivery of $AlCl_3$ results better uniformity of $Al_2O_3$ concentration. (See FIG. 8). It is preferable that $Al_2O_3$ is evenly distributed throughout the core layer because its presence assists in de-clustering of rare earth dopant(s) within the core. This results-in high laser/amplifier efficiency through reduced quenching. This delivery process can also be utilized in Al doped (for example, in order to replace Ge) transmission fiber (i.e. fiber without rare-earth dopants in the core) when a fiber layer with relatively high index of refraction (i.e. higher than silica) is needed.

Figure 9:
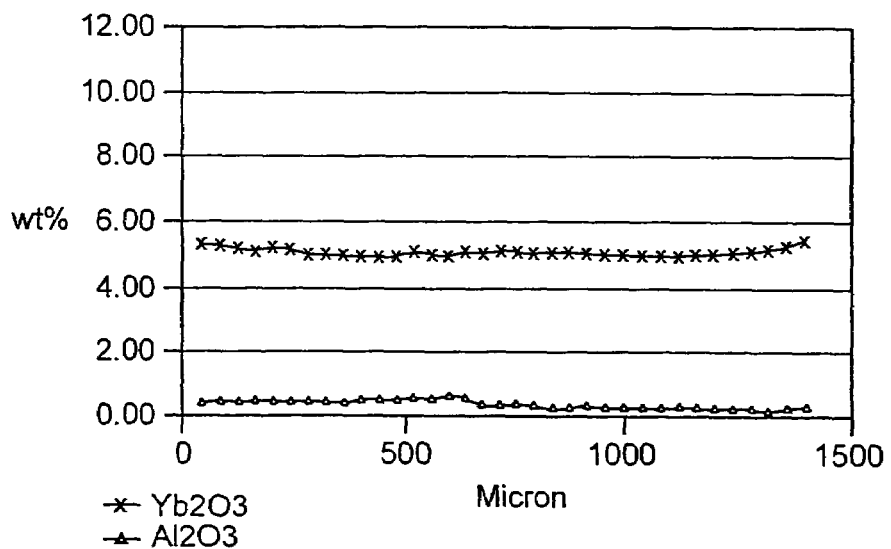
FIG. 9 is a graph illustrating $Yb_2O_3$ and $Al_2O_3$ concentration within a core optical fiber preform.

As shown in FIG. 9, the heated Helium delivery of $AlCl_3$ resulted in a very uniform distribution of Yb and Al throughout the preform core, which results in uniform concentration of Yb and Al within the fiber core 12. More specifically, the resultant variability of $Al_{2O3}$ concentration in the core is less than 2 wt % and preferably less than 0.5 wt % and more preferably less than 0.25 wt %, especially for maximum $Al_2O_3$ concentration of over 3 wt %. It is also preferable that the ratio of max wt % to min wt % of $Al_2O_3$ concentration in any given fiber layer (e.g. core, cladding, etc.) be less than 2:1, preferably less than 1.5:1, more preferably less than 1.2:1, and even more preferably less than 1.1:1, especially for maximum $Al_2O_3$ concentration of over 3 wt %.

The Yb vapor delivery is carried by Argon gas and is accomplished by heating organometallic $Yb(fod)_3$ in the temperature range of 150° C.-180° C., which results in a soot preform core with $Yb_2O_3$ concentration from about 0.2 wt % to 3 wt %. In order to make the optical fiber 10 of this example, the $Yb(fod)_3$ containing vessel temperature of 163° C. was used to achieve the $Yb_2O_3$ concentration of about 0.6 wt %. The delivery of other materials is carried out by conventional oxygen delivery at temperatures below 100° C.

Figure 10:
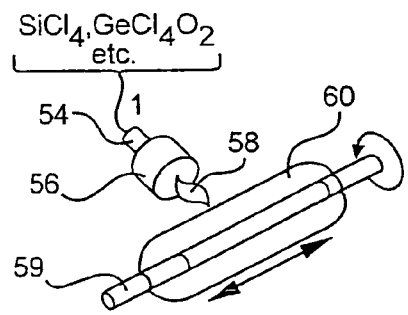
FIG. 10 is a schematic illustration of the formation of a core soot preform.

More specifically, according to one embodiment of the present invention, the $Yb(fod)_3$, $AlCl_3$, $SiF_4$, $SiCl_4$ and GeCl4 are delivered to a gas burner 56. (See FIG. 10.) The gas burner 56 generates a temperature of about 2000° C. The pre-determined amounts of various vapor-phase materials delivered for each core (or clad) stage are carried by oxygen provided to the burner 56, and react in the burner flame 58 where the desired glass-soot particles formed. The soot particles are then deposited onto a rotating bait-rod 59 or core cane 60 through the thermopheretic mechanism to result in the designed soot-preform 62 which will be used to manufacture single polarization fiber with the Yb-doped single-mode core.

Figure 11:
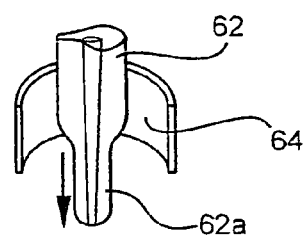
FIG. 11 illustrates consolidation of a soot preform into a glass preform.
Figure 13:
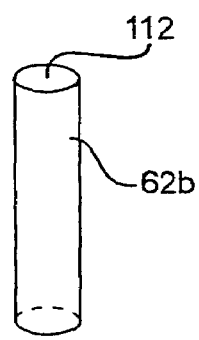
FIG. 13 illustrates schematically a core cane utilized to manufacture the fiber of FIGS. 1B, 1C and 4A-4C.

After the core soot preform layer is layered down and the soot preform 62 is cooled to room temperature, the bait rod 59 is removed from the center of core soot preform 62. The core soot preform 62 is then consolidated (densified into the solid glass) to become a solid glass-preform 62A which is drawn into core cane 62B. (See FIGS. 11 and 13.)

Figure 12:
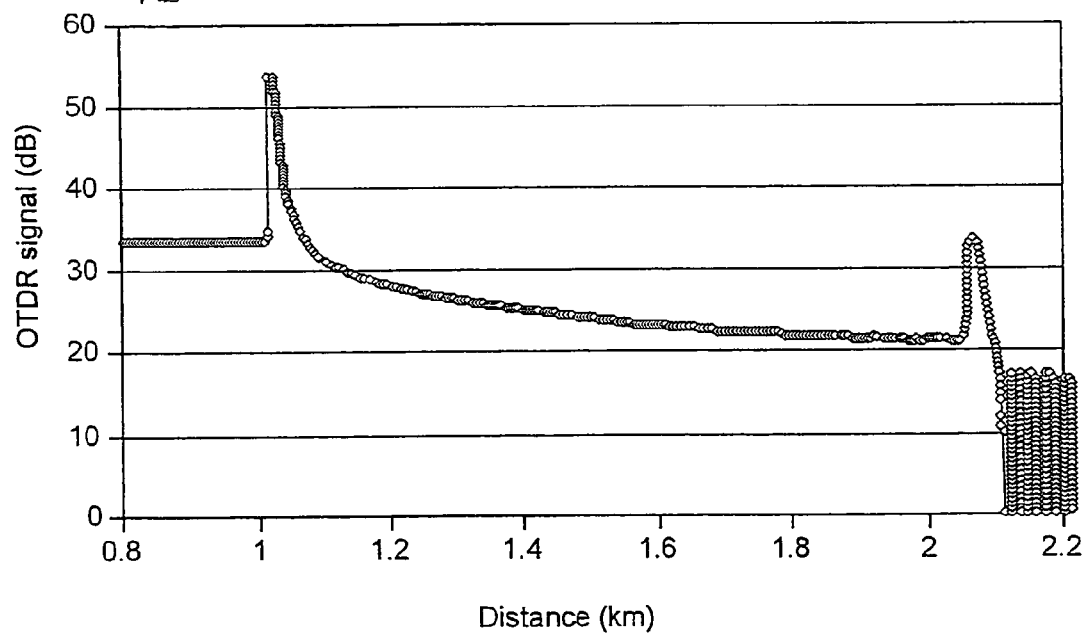
FIG. 12 illustrates inner cladding background loss of an exemplary fiber.

Applicants discovered that a proper choice of high temperature and fast down-feed rate during consolidation results in low crystallization formation in the resulting solid glass preform, which results in an optical fiber having very low passive (background) loss, and also eliminates the conventional double-redraw process associated with Al doped blanks. More specifically, soot preform 62 is down fed relative to the furnace at the rate and temperature sufficient to minimize crystallization such that the background loss of the resultant fiber core is less than 8 dB/km, and preferably 3 dB or less, at a wavelength of 1280 nm, as illustrated in FIG. 12. The 'core' soot preform 62 is consolidated into solid glass-preform 62A in a high temperature (1400° C. to 1600° C.) furnace 64. It is preferred that the furnace temperature during consolidation be 1500° C. to 1600° C., and more preferably 1530° C. to 1580° C. In order to produce the optical fiber 10 of this example we utilized the furnace temperature of 1550° C. Applicants found that for temperatures of below 1500° C. the preform glass forms crystals and the amount of crystallization is significantly reduced with furnace temperatures of above 1530° C. While in the furnace, the soot preform 62 is moved relative to the furnace 64 (e.g., down-fed) at a rate of 7 nm/min or faster. It is preferred that this rate be 8 mm/min to 12 mm/min. The optical fiber of this example made by down-feeding the soot preform 62 at the rate of 9 mm/min. It is noted that instead of down-feeding the soot preform, the soot preform may be held in a constant position and the furnace may be moved instead. Thus, by specifying that the soot preform is moved relative to the furnace, applicants intend to cover any relative movement between the soot preform and the furnace. Generally, it is recommended that the higher the furnace temperature, the faster the rate of relative motion between the furnace and the soot preform.

With the above described high consolidation temperatures and fast down-feed rate, the resultant optical fiber 10 has the core background loss of less than 8 dB/km. More preferably, the optical fiber exhibits core background loss of less than 5 dB/km. In this example the background loss of the core is less than 3 dB/km. The core background loss was measured by making (single mode) optical fiber without the outer cladding and measuring the background loss of this fiber.

The core soot preform 62 has sufficient amount of Ge to produce, after the cladding process is completed, a fiber with core delta of 0.06 to 0.1%. After the core preform 62 has been consolidated, as described above, it is drawn into the core cane 62B. The core cane 62B is preferably 1 meter long and about 8 mm in diameter. The core cane 62B is illustrated schematically in FIG. 13.

2. Stress-rods fabrication. Additionally, a soot-preform containing the desired amount of B, P or Ge (for example in the amounts described above) for stress generation can be made in a similar manner by OVD with the use of the respective vapor ingredient. The soot preform is subsequently consolidated, and is redrawn into a solid rod as the stress-applying part 13, 15.

Figure 14:
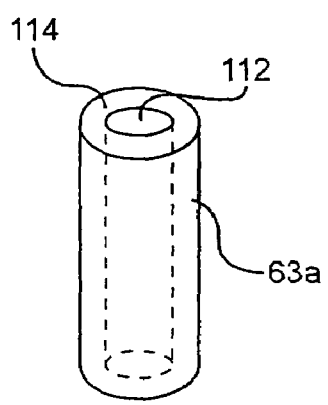
FIG. 14 illustrates schematically a core-clad cane utilized to manufacture the fiber of FIGS. 1B, 1C and 4A-4C.

3. Stress-rods fabrication. The core cane 62B is overclad with silica soot to form a core/clad (soot) blank (referred herein as the first clad bank 63). The first clad blank is then consolidated to form cane 63A. The first clad blank 63 has a core to the first clad diameter ratio of 0.4 to 0.6. The cane 63A is about 42 mm in diameter. Cane 63A is illustrated schematically in FIG. 14.

Alternatively a sleeving process may be utilized to form cane 63A, by placing a silica sleeve around the core cane 62A.

Figure 15:
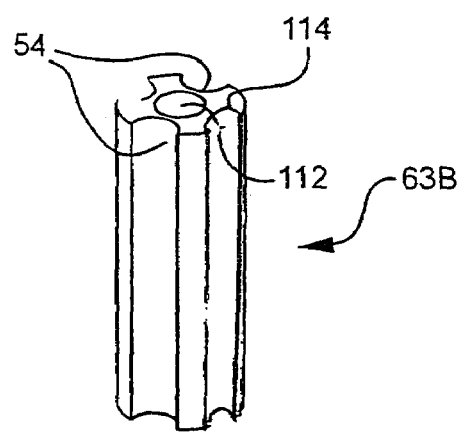
FIG. 15 illustrates schematically a grooved cane utilized to manufacture the fiber of FIGS. 1B, 1C and 4A-4C.

4. Grooved cane formation. The cane 63A includes sections 112, 114 which correspond to the core 12 and the first cladding layer 14 of the optical fiber 10. Cane 63A is preferably about 1 meter long and about 8 mm in diameter. The four grooves 54 are then ground into two-diametrically opposite longitudinal sides of the cane 63A, for example to a width of about 6.4 mm and to a depth of about 8 to 10 mm, thereby forming grooved cane 63B. (See FIG. 15.) The groove depth depends on the thickness of the first clad layer, but should be such that its bottom substantially abuts the section 112 (corresponding to the fiber core 12), as illustrated in FIG. 15. The grooved cane 63B is HF etched for about 30 minutes to clean any grinding residue and then redrawn to an appropriate size cane (OD of about 8 mm).

Figure 16:
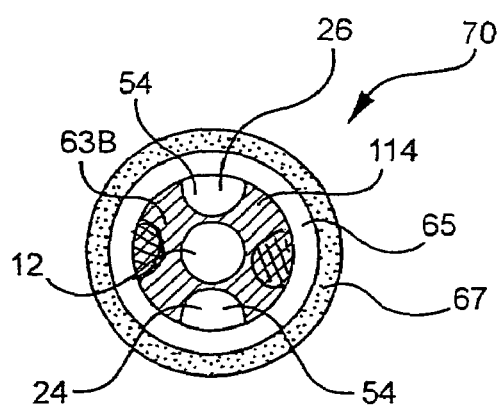
FIG. 16 illustrates schematically a glass tube with the inserted grooved cane of FIG. 15.

The grooved and redrawn cane 63B with a pair of the stress-rods attached and inserted in one set of diametrically positioned grooves, is then inserted into a 1 meter long silica tube or sleeve 65 overclad with silica soot 67 (for example, about 800-1000 gms.), as shown in FIG. 16, to form a preform subassembly 70. Silica overcladding 67 method on the sleeve 65 is preferably produced by an Outside Vapor Deposition (OVD). The exemplary silica tube 65 may have an inner diameter of about 8.8 mm and an outer diameter of about 11.8 mm which supports a layer of silica soot 67. The silica tube baring soot is cleaned, both inside and outside, with a chemical solvent or alcohol (IPA for example), prior to the insertion of the etched and re-drawn cane 63B into the tube 65. If needed, the two holes 24, 26 in the preform subassembly 70 may be further etched via HF to enlarge the holes.

Figure 17:
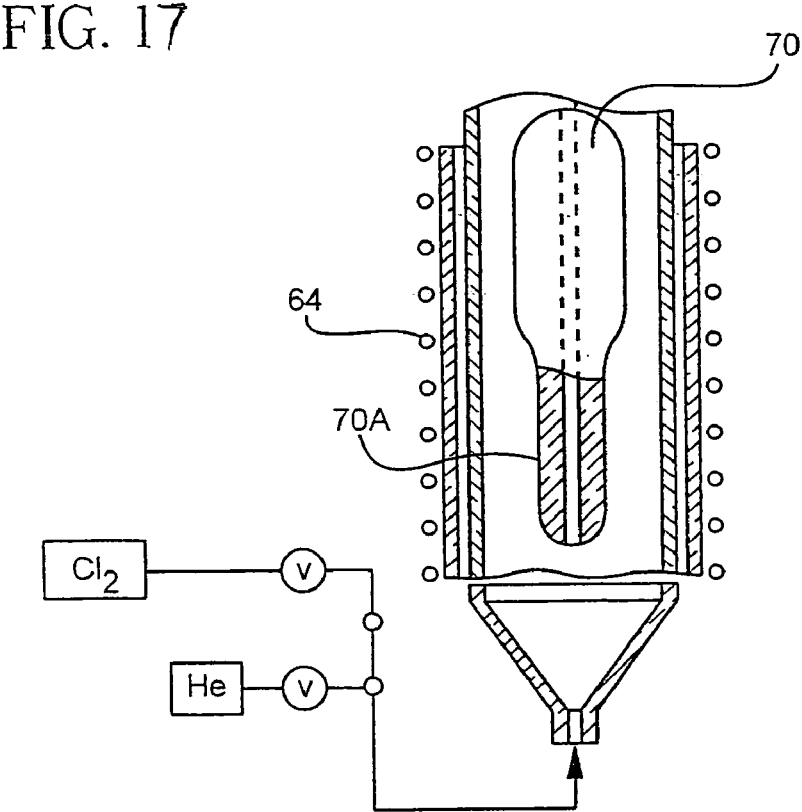
FIG. 17 illustrates schematically an exemplary consolidation process utilized to manufacture the fiber of FIGS. 1B, 1C and 4A-4C.
Figure 18:
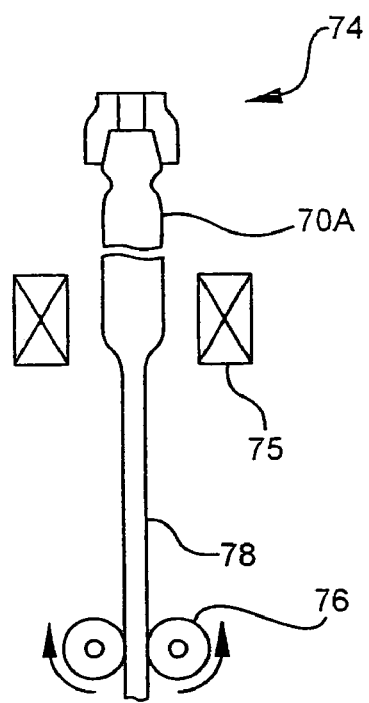
FIG. 18 illustrates schematically a redraw tower utilized to manufacture the fiber of FIGS. 1B and 4A-4C.

The preform subassembly 70 of FIG. 16 is then consolidated in accordance with a conventional consolidation process as shown in FIG. 17 by first drying in a consolidation furnace 64 in an atmosphere of $Cl_2$, and then consolidating in the furnace in a He-containing atmosphere to produce a consolidated preform 70A. The consolidated preform 70A is then inserted into a redraw tower 74 as shown in FIG. 18. The preferred down feeding rate is about 7 mm/min. Heat is applied to preform 70A by heating element 75 and it is drawn down by tension applying wheels 76 into an approximately 7-8 mm diameter cane 78. While the redraw process (drawing to a smaller diameter core cane from the preform) is occurring, a positive pressure (about 1 psi) is applied to the holes 24, 26 sufficient to keep them from closing. The pressure may be sufficient to cause the central core to elongate slightly. The pressure used is a function of the draw temperature, glass viscosity, and draw speed among other factors.

Figure 19:
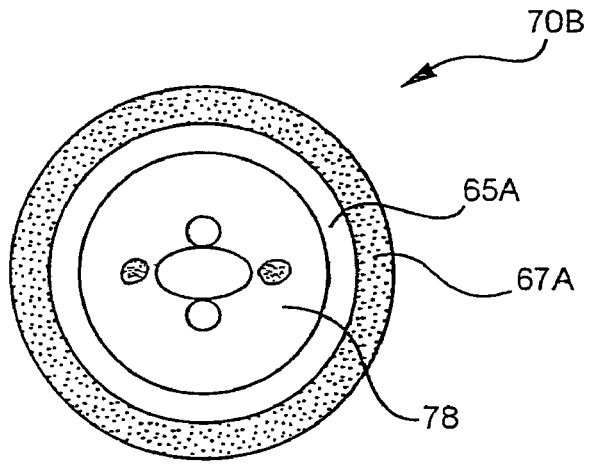
FIG. 19 illustrates schematically a preform subassembly that includes a silica tube overclad with silica soot.

This cane 78, now having an elliptically shaped central core and air holes, is again inserted into a 1 meter long silica tube 65A which is overclad with about 1000 grams of silica soot 67A, as shown in FIG. 19 to form preform subassembly 70B. This preform subassembly 70B is consolidated in the same manner as heretofore to form consolidated blanks 70C. The consolidated blanks 70C will form the basis for the core and the inner clad portion of the optical fiber 10.

Figure 20:
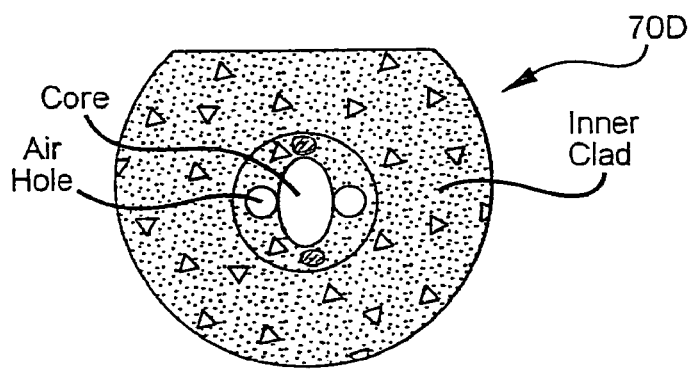
FIG. 20 illustrates schematically a machined core/inner clad blank.
Figure 21:
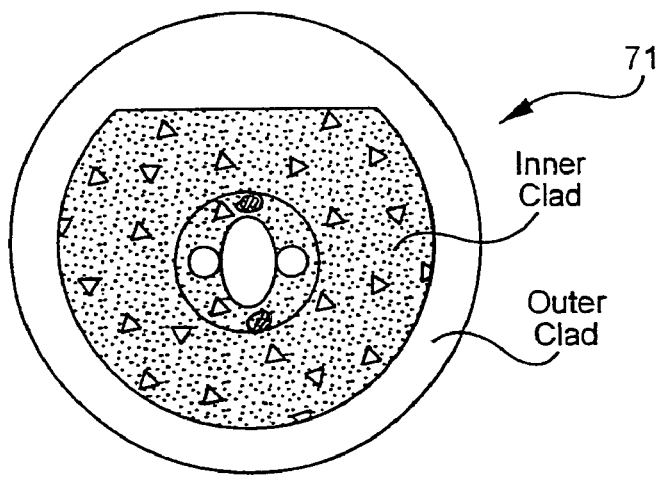
FIG. 21 illustrates schematically a consolidated blank after the core/inner cladding blank it has been machined as shown in FIG. 20 and overclad with the silica based outer cladding material.

The consolidated blanks 70C are then machined, if needed, to desired shape. Breaking circular symmetry in the inner clad layer enhances pump light absorption efficiency. A machined core/inner cladding blank 70D is illustrated schematically in FIG. 20. The machined blank 70D is overclad again, for example by $SiO_2$ with index lowering dopants and then consolidated to a consolidated blank 71. The down-doped silica layer of the consolidated blank 71 will form the second, or outer cladding 16 of the optical fiber 10. FIG. 21 illustrates schematically an exemplary consolidated blank 71. If boron is used in overcladding, it is preferred that consolidation is performed in Fluorine environment. In this example, the index lowering dopants are B and F.

More specifically, $B_{2O3}$ and $SiO_2$ were vapor deposited on the ground glass preform to form a $B_2O_3$ and $SiO_2$ soot layer by using tri-ethyl borate and $SiCl_4$ delivered to the burner. The blank (i.e. machined or ground glass preform) covered with the $B_2O_3$ —doped silica soot layer was then Fluorine doped during the consolidation step by using $SiF_4$ gas provided to the consolidation furnace. During this second consolidation step, the consolidation furnace is operated at the temperature range of 1300° C.-1400° C. At these consolidation temperatures Fluorine diffuses into the boron/silica soot layer, but does not penetrate into the underlying glass layer. The optical fiber of this example was produced by utilizing consolidation temperature of 1350° C., so as to facilitate adequate Fluorine doping through diffusion. In this example, the third layer of the preform (outer cladding) has a shape similar to that of the second layer (inner cladding).

Figure 22:
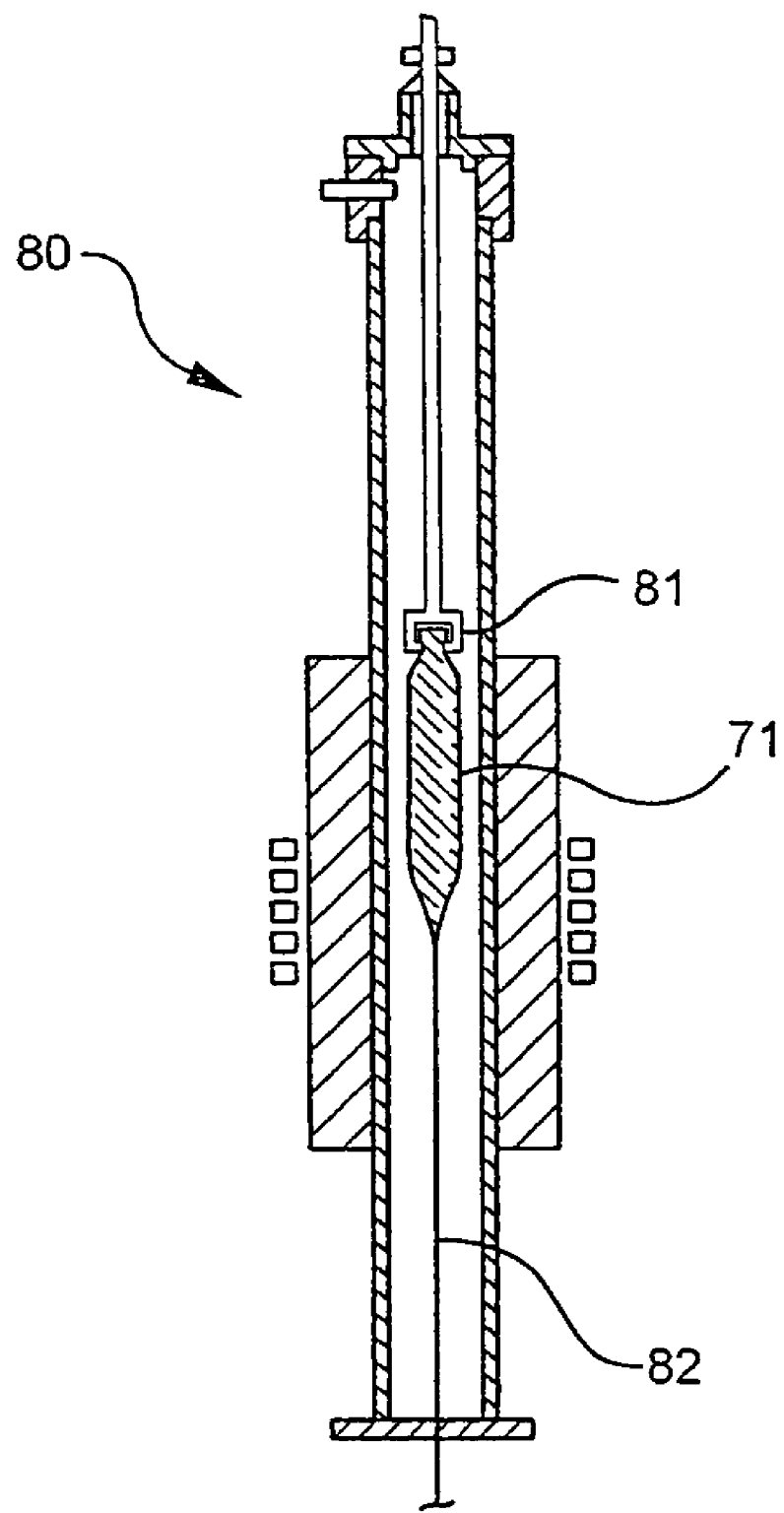
FIG. 22 illustrates schematically a process for drawing fiber utilized to manufacture the fiber of FIGS. 1B, 1C and 4A-4C.

The consolidated blank 71 is then suspended from a handle 81 in a draw furnace 80 as shown in FIG. 22 and a fiber 82 is drawn therefrom. During draw, a small positive pressure (about 1 psi or less) is applied to the holes to keep them from closing. This causes the core to become (more) elliptically shaped. In the exemplary fiber depicted in FIGS. 1B, 1C and 4A-4C we utilize positive pressure of less than 0.1 psi. The draw speed is about 1 m/sec. The resulting fiber has an elliptically shaped core and, dual stress rods and dual air holes.

As should be recognized, the elongation of the core may occur in the redraw step, the draw step, or combinations thereof to achieve the desired aspect ratio of the central core. In either case, a positive pressure is applied to the holes in the preform (and fiber) to cause the elongation to occur.

It will be apparent to those skilled in the art that variations and modifications can be made to the present invention without departing from the scope of the invention. For example, although step index structures are show, other graded index structures may be employed. Moreover a ring structure may be added to the fiber profile as well and would still function acceptably. Thus, it is intended that the present invention cover the modifications and variations of this invention provided they come within the scope of the appended claims and their equivalents.

What is claimed is:

1. An optical fiber comprising:
    (i). a silica based, single mode rare earth doped core having a radius of at least 7 μm and, an effective area of at least 153 μm$^2$, and a first index of refraction $n_1$;
    (ii). at least one silica based cladding surrounding the core and having a second index of refraction $n_2$, such that $n_1 > n_2$, said cladding having: (A) a only two stress rods, and (B) a only two air holes extending longitudinally through the length of said optical fiber, and said air holes are circular with a diameter of 5 μm to 50 μm; wherein said optical fiber supports a single polarization mode within a single polarization band or poses polarization maintaining properties within the operating wavelength range and said core has a refractive index delta relative to said cladding of no more than 0.2%.

2. The optical fiber according to claim 1, wherein said at least one silica based cladding includes an inner cladding with the index of refraction $n_2$, and a silica based outer cladding surrounding said inner cladding, said outer cladding having a third index of refraction $n_3$, such that $n_2 > n_3$.

3. The optical fiber according to claim 1 wherein said rare earth core is a circular core.

4. The optical fiber according to claim 3 wherein said rare earth core has a radius of 5 μm to 50 μm.

5. The optical fiber according to claim 1 wherein said core is elliptical and the ratio of its maximum dimension to its minimum dimension is at least 1.5:1.

6. The optical fiber according to claim 1 wherein said rare earth core includes Yb.

7. The optical fiber according to claim 1 wherein said rare earth core includes Er.

8. The optical fiber according to claim 1 wherein said stress rods have at least one dimension of 5 μm to 100 μm.

9. The optical fiber according to claim 1 wherein said stress rods have a circular cross-section and have at least one radius of 5 μm to 100 μm.

10. The optical fiber according to claim 2 wherein said inner cladding has shortest dimension $D_{IN}$ of at least 145 μm.

11. The optical fiber according to claim 2 wherein said silica based outer cladding contains at least one of the following dopants: Fluorine, Boron.

12. The optical fiber according to claim 1 wherein the core delta is 0.17% or less.

13. The optical fiber according to claim 1 wherein the core delta is 0.08% to 0.13%.

14. The optical fiber according to claim 1 wherein said operating wavelength range is 1000 nm to 1120 nm, or 1520 nm to 1580 nm.

15. The optical fiber of claim 1, wherein the core further contains at least one athermal dopant selected from the group of: Li, Na, K, Rb, Cs, and B.

16. An optical fiber comprising:
    (i). a silica based core having a first index of refraction $n_1$ and an effective area of at least 153 μm$^2$;
    (ii). at least one silica based cladding surrounding the core and having a second index of refraction $n_2$, such that $n_1 > n_2$, and said core has a refractive index delta relative to said at least one silica based cladding of no more than 0.2%, said cladding having (A) plurality of stress rods and (B) a plurality of air holes in physical contact with the core and extending longitudinally through the length of said optical fiber, and said air holes are circular with a diameter of 5 μm to 50 μm; wherein said optical fiber supports a single polarization within the operating wavelength range situated inside single polarization band SPB and the SPB has a width of at least 20 nm.

17. The optical fiber according to claim 16 wherein said operating wavelength range is 1000 nm to 1120 nm, or 1520 nm to 1580 nm.

18. The optical fiber according to claim 16 wherein said stress rods have at least one dimension of 5 μm to 100 μm.

* * * * *

UNITED STATES PATENT AND TRADEMARK OFFICE
CERTIFICATE OF CORRECTION

| | |
|---|---|
| PATENT NO. | : 7,382,957 B2 |
| APPLICATION NO. | : 11/483229 |
| DATED | : June 3, 2008 |
| INVENTOR(S) | : Xin Chen et al. |

Page 1 of 1

It is certified that error appears in the above-identified patent and that said Letters Patent is hereby corrected as shown below:

*Col.*    *Line*                       *Description*

1      4      Please add the following <u>new</u> paragraph on page 1 before "Background of the Invention". line 4

This invention was made with Government support under Cooperative Agreement No. MDA972-02-3-0004 awarded by The Defense Advanced Research Projects Agency. The Government may have certain rights in some of the claims of this invention.

Signed and Sealed this

Second Day of December, 2008

JON W. DUDAS
*Director of the United States Patent and Trademark Office*